United States Patent
Namou et al.

(10) Patent No.: US 9,985,453 B2
(45) Date of Patent: May 29, 2018

(54) APPARATUS FOR DISCHARGING A HIGH-VOLTAGE BUS

(71) Applicant: GM GLOBAL TECHNOLOGY OPERATIONS LLC, Detroit, MI (US)

(72) Inventors: Andrew J. Namou, West Bloomfield, MI (US); Mohammad N. Anwar, Van Buren Township, MI (US); Ahmad Albanna, Dearborn Heights, MI (US); Syed M. Kadry, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 15/059,979

(22) Filed: Mar. 3, 2016

(65) Prior Publication Data

US 2017/0256972 A1   Sep. 7, 2017

(51) Int. Cl.
*H02J 7/00* (2006.01)
*B60L 3/00* (2006.01)
*H02M 1/32* (2007.01)

(52) U.S. Cl.
CPC .............. *H02J 7/0065* (2013.01); *B60L 3/00* (2013.01); *H02J 7/0068* (2013.01); *H02M 1/32* (2013.01); *H02J 2007/0067* (2013.01)

(58) Field of Classification Search
USPC .......................................... 320/136; 363/132
See application file for complete search history.

(56) References Cited

U.S. PATENT DOCUMENTS

| 2008/0252242 A1* | 10/2008 | Akama ..................... H02P 6/06 318/400.14 |
| 2010/0250194 A1 | 9/2010 | Newhouse et al. |
| 2010/0315024 A1* | 12/2010 | Najima ............ H02M 7/53871 318/139 |
| 2012/0187775 A1 | 7/2012 | Nordstrom et al. |
| 2013/0033914 A1* | 2/2013 | Yahata .................... H02M 7/48 363/132 |
| 2013/0257446 A1* | 10/2013 | Soell ................... B60L 11/1803 324/503 |
| 2013/0291833 A1* | 11/2013 | Eisen ...................... F02P 3/053 123/406.12 |
| 2014/0176034 A1* | 6/2014 | Matsumura ............ B60L 3/003 318/430 |

(Continued)

*Primary Examiner* — Brian Ngo
(74) *Attorney, Agent, or Firm* — Quinn IP Law

(57) ABSTRACT

A power inverter including a multi-phase inverter circuit is electrically connected to a high-voltage DC power source, and includes a capacitor electrically connected between positive and negative conductors of a high-voltage bus. A normally-ON discharge switch is electrically connected in series with a discharge resistor between the positive and negative conductors of the high-voltage bus. The discharge switch includes a control gate, wherein the control gate of the discharge switch is in communication with an ignition switch. The discharge switch is controllable to an open state between the positive and negative conductors of the high-voltage bus when the ignition switch is in an ON state. The discharge switch achieves a closed state to provide a low-impedance electric current flow path through the discharge resistor between the positive and negative conductors of the high-voltage bus when the ignition switch is in an OFF state.

17 Claims, 3 Drawing Sheets

(56) References Cited

U.S. PATENT DOCUMENTS

| | | | | |
|---|---|---|---|---|
| 2015/0097426 A1* | 4/2015 | Yamane | ............ | B60L 11/1803 |
| | | | | 307/10.1 |
| 2015/0097501 A1* | 4/2015 | Yamane | ................ | B60L 1/00 |
| | | | | 318/400.3 |
| 2015/0217640 A1* | 8/2015 | Bissontz | ............ | B60L 11/1868 |
| | | | | 307/9.1 |

* cited by examiner

US 9,985,453 B2

APPARATUS FOR DISCHARGING A HIGH-VOLTAGE BUS

TECHNICAL FIELD

The disclosure relates to discharging electrical energy stored on a high-voltage bus, including a system wherein the high-voltage bus transfers electric power to a power inverter.

BACKGROUND

Power inverter circuits may include a bulk capacitor arranged across a high-voltage bus to provide electrical stability and store supplemental electric energy. When the power inverter circuit is not in operation, or in certain other circumstances, it may be desirable to discharge the electric energy on the high voltage bus including the bulk capacitor.

SUMMARY

A power inverter electrically connected to a high-voltage DC power source via a high-voltage bus is described. The power inverter includes a capacitor electrically connected between positive and negative conductors of the high-voltage bus. The power inverter includes a multi-phase inverter circuit electrically connected to the positive and negative conductors of the high-voltage bus. A normally-ON discharge switch is electrically connected in series with a discharge resistor between the positive and negative conductors of the high-voltage bus. The discharge switch includes a control gate, wherein the control gate of the discharge switch is in communication with an ignition switch. The discharge switch is controllable to an open state between the positive and negative conductors of the high-voltage bus when the ignition switch is in an ON state. The discharge switch achieves a closed state to provide a low-impedance electric current flow path through the discharge resistor between the positive and negative conductors of the high-voltage bus when the ignition switch is in an OFF state.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
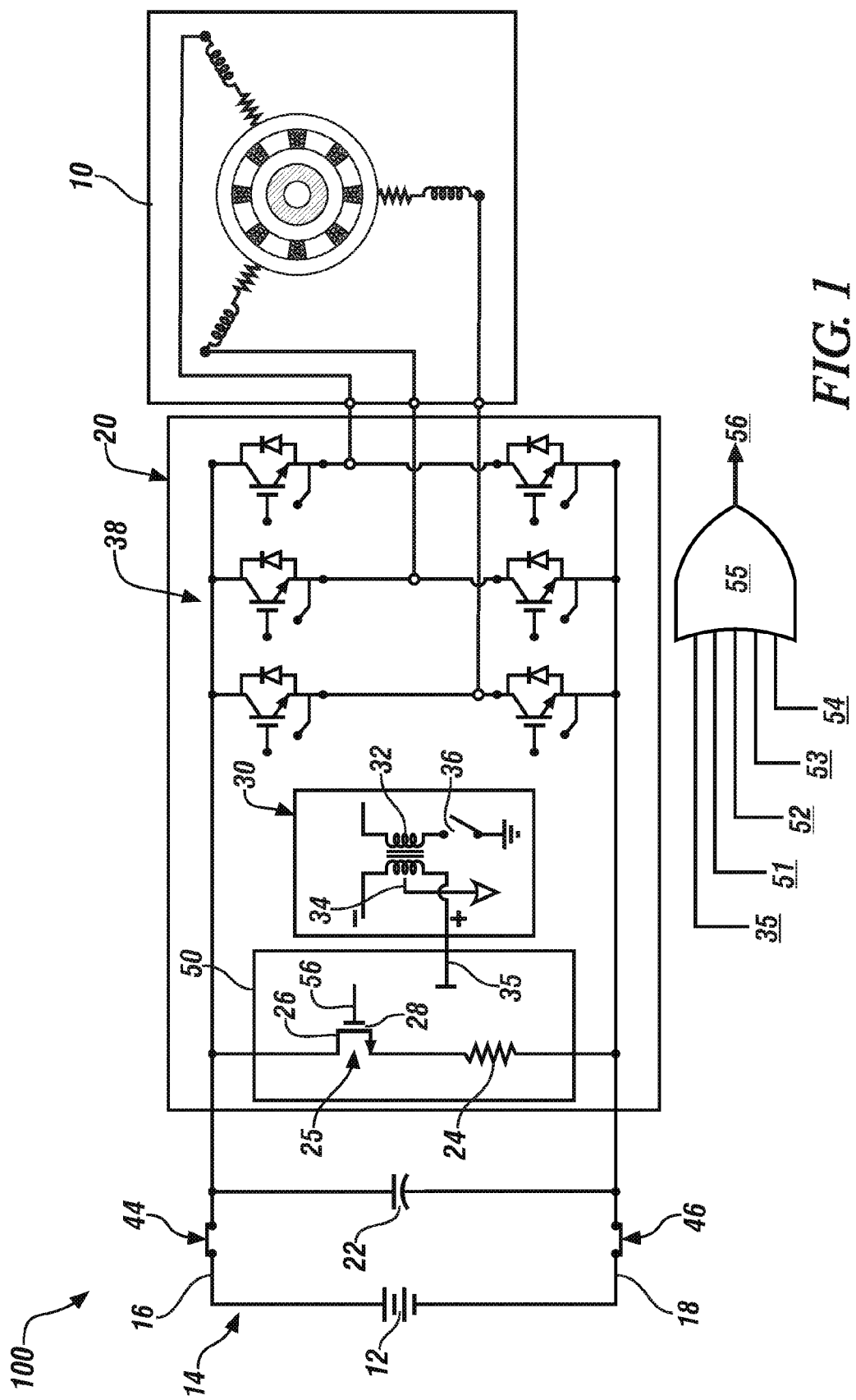
FIGS. 1, 2 and 3 schematically illustrate embodiments of a power inverter module including a high-voltage bus and a passive discharge circuit, wherein the high-voltage bus is electrically connected between a high-voltage DC electric power source and the power inverter module, in accordance with the disclosure.

Referring now to the drawings, wherein the depictions are for the purpose of illustrating certain exemplary embodiments only and not for the purpose of limiting the same, FIG. 1 schematically illustrates one embodiment of a power inverter module 20 that includes a passive discharge circuit 25 for discharging electric power across a high-voltage bus 14, wherein the high-voltage bus 14 is electrically connected between a high-voltage DC electric power source 12 and the power inverter module 20. The power inverter module 20 may be an element of a first embodiment of a motor control system 100 that includes an electric machine 10 that is operatively controlled by the power inverter module 20 employing electric power from the high-voltage DC electric power source 12. In one non-limiting embodiment, the power inverter module 20 may be employed on a vehicle as an element of a propulsion system. Like numerals indicate like or corresponding parts throughout the several views.

The electric machine 10 may be a motor/generator or another suitable multi-phase electric machine, e.g., a permanent magnet device. The power inverter module 20 electrically connects to the high-voltage DC electric power source 12 via a positive conductor 16 and a negative conductor 18 of the high-voltage bus 14. The high-voltage bus 14 may include first and second contactors 44, 46, respectively, that are controllable to connect the respective positive and negative conductors 16, 18 of the high-voltage bus 14 to positive and negative sides of the high-voltage DC electric power source 12. The power inverter module 20 includes a bulk capacitor 22 electrically arranged between the positive conductor 16 and the negative conductor 18 of the high-voltage bus 14.

The first and second contactors 44, 46 are inductively-controlled normally-open switch devices that electrically connect to an ignition switch 36. When the ignition switch 36 is in a key-OFF state, the first and second contactors 44, 46 are open, thus preventing electric power flow between the respective positive and negative conductors 16, 18 and the high-voltage DC electric power source 12. When the ignition switch 36 is in a key-ON state, the first and second contactors 44, 46 are closed, thus permitting electric power flow between the respective positive and negative conductors 16, 18 and the high-voltage DC electric power source 12.

The power inverter module 20 includes an inverter 38 that includes a plurality of switch pairs that electrically connect in series between the positive and negative conductors 16, 18 of the high-voltage bus 14. Each of the switches of the switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. Each of the switch pairs corresponds to one of the phases of the electric machine 10. Other elements of the power inverter module 20 preferably include a plurality of gate drive circuits and a controller, wherein the gate drive circuits control activation and deactivation of the switches in response to control signals, e.g., pulsewidth-modulated control signals, which originate from the controller. The power inverter module 20 includes other electrical components including capacitors, resistors and other electrical circuit components to accomplish functions related to electrical noise suppression, load balancing and the like.

The passive discharge circuit 25 is disposed between the positive conductor 16 of the high-voltage bus 14 and the negative conductor 18 of the high-voltage bus 14. The passive discharge circuit 25 includes a normally-ON discharge switch 26 and a low-impedance discharge resistor 24. The discharge switch 26 electrically connects in series with the low-impedance discharge resistor 24 between the positive conductor 16 and the negative conductor 18. The discharge switch 26 in this embodiment may be an N-channel depletion mode MOSFET device, or a JFET device, or another suitable device that operates as described herein. The discharge switch 26 includes an input line, an output line and a control gate 28. The discharge switch 26 is controllable to an open state between the positive and negative conductors 16, 18 of the high-voltage bus 14 when the ignition switch 36 is in the key-ON state. The discharge switch 26 achieves a closed state to provide a low-impedance electric current flow path through the discharge resistor 24 between the positive and negative conductors 16, 18 of the high-voltage bus 14 when the ignition switch is in the key-OFF state.

A composite trigger gate 55 communicates with the control gate 28. The composite trigger gate 55 may be in the form of a multi-input logic device configured with a plurality of input lines 35, 51, 52, 53, and 54 and a discrete output line 56 that communicates with the control gate 28 of the discharge switch 26. The composite trigger gate 55 may be a logic OR gate or another suitable logic device that accommodates a plurality of activation signals associated with the input lines 35, 51, 52, 53, and 54, including the input line 35, and corresponding second, third, fourth and fifth activation signals. The second, third, fourth and fifth activation signals 51, 52, 53 and 54 may originate from a vehicle controller, a service controller, an accelerometer, or another suitable source.

A flyback transformer 30 including a primary circuit 32 and a secondary circuit 34 is arranged with the secondary circuit 34 in communication with one of the input lines, e.g., input line 35 to the composite trigger gate 55. The primary circuit 32 is electrically connected between a low-voltage power supply and an electrical ground via the ignition switch 36. The flyback transformer 30 may be an element of a DC supply associated with the gate drivers of the switches of the inverter 38, and is preferably electrically isolated. The flyback transformer 30 is one embodiment of a DC-DC converter that provides an isolated topology suitable for low power applications, and supplies the power to the gate drivers of the switches of the inverter 38. The positive voltage is used by the gate driver to turn on the inverter switch (ON state). The negative voltage is used to deactivate the inverter switch (OFF State). As the discharge switch 26 is a normally-ON device, providing the switch with negative voltage will deactivate the discharge switch (OFF state). The discharge switch 26 modulates the input DC power to output the +15V and −8V at the secondary split.

During operation, with the ignition switch 36 in the key-ON state, the flyback transformer 30 may provide an electrical bias to control the discharge switch 26 to the OFF or open state. When the ignition switch 36 achieves the key-OFF state, e.g., in response to a vehicle off state, or in response to a loss of low-voltage DC electric power, the flyback transformer 30 is de-energized, causing power at the control gate 28 of the discharge switch 26 to deplete, enabling the passive discharge circuit 25 to activate and discharge any electric energy on the high-voltage bus 14. When the first and second contactors 44, 46 are both closed and the discharge switch 26 is open, i.e., de-activated, there is no electric current flow through the low-impedance discharge resistor 24, and thus no latent or residual electric power loss. When the composite trigger gate 55 generates an activation signal on the discrete output line 56, the low-impedance discharge resistor 24 of the passive discharge circuit 25 passively discharges electric power stored in the bulk capacitor 22, the power inverter module 20 and the electric machine 10 across the positive conductor 16 and the negative conductor 18 of the high-voltage bus 14. The composite trigger gate 55 may generate the activation signal on the discrete output line 56 when one of the associated conditions is satisfied.

The low-impedance discharge resistor 24 may be sized based upon the magnitude of the electric potential across the high-voltage bus 14 and a preferred or desired discharge time. The average power rating may be reduced to a rating that comprehends peak power capability, and thus differs from resistances of devices employed in a passive system wherein the discharge resistor is always connected to the high voltage bus and generates power loss. The discharge power, which drives the power rating of the low-impedance discharge resistor 24, may be determined based upon the magnitude of the electric potential across the high-voltage bus 14, the preferred or desired discharge time, and the capacitance of the bulk capacitor 22. The design parameters for the discharge switch 26 may be determined based upon the magnitude of the electric potential across the high-voltage bus 14, electrical current, the preferred discharge time, and the resistance of the low-impedance discharge resistor 24.

The concepts described herein include a passive discharge circuit 25 that consumes little or no electrical energy while permitting rapid, automatic discharge of electric potential in the high-voltage bus. The time period for rapid discharge may be less than five seconds in certain embodiments. The discharge circuit 25 may further prevent an over-discharge of the high-voltage DC electric power source 12 in a situation when the contactors 44, 46 become welded. The discharge circuit 25 may be responsive to operation in an uncontrolled generator (UCG) mode and may provide protection in the event of airbag deployment. The discharge circuit 25 may prevent inadvertent discharge of the high-voltage DC electric power source 12 which may otherwise be caused when the system is dropped or experiences a high g-force event when the ignition switch 36 is in the key-ON state.

Figure 2:
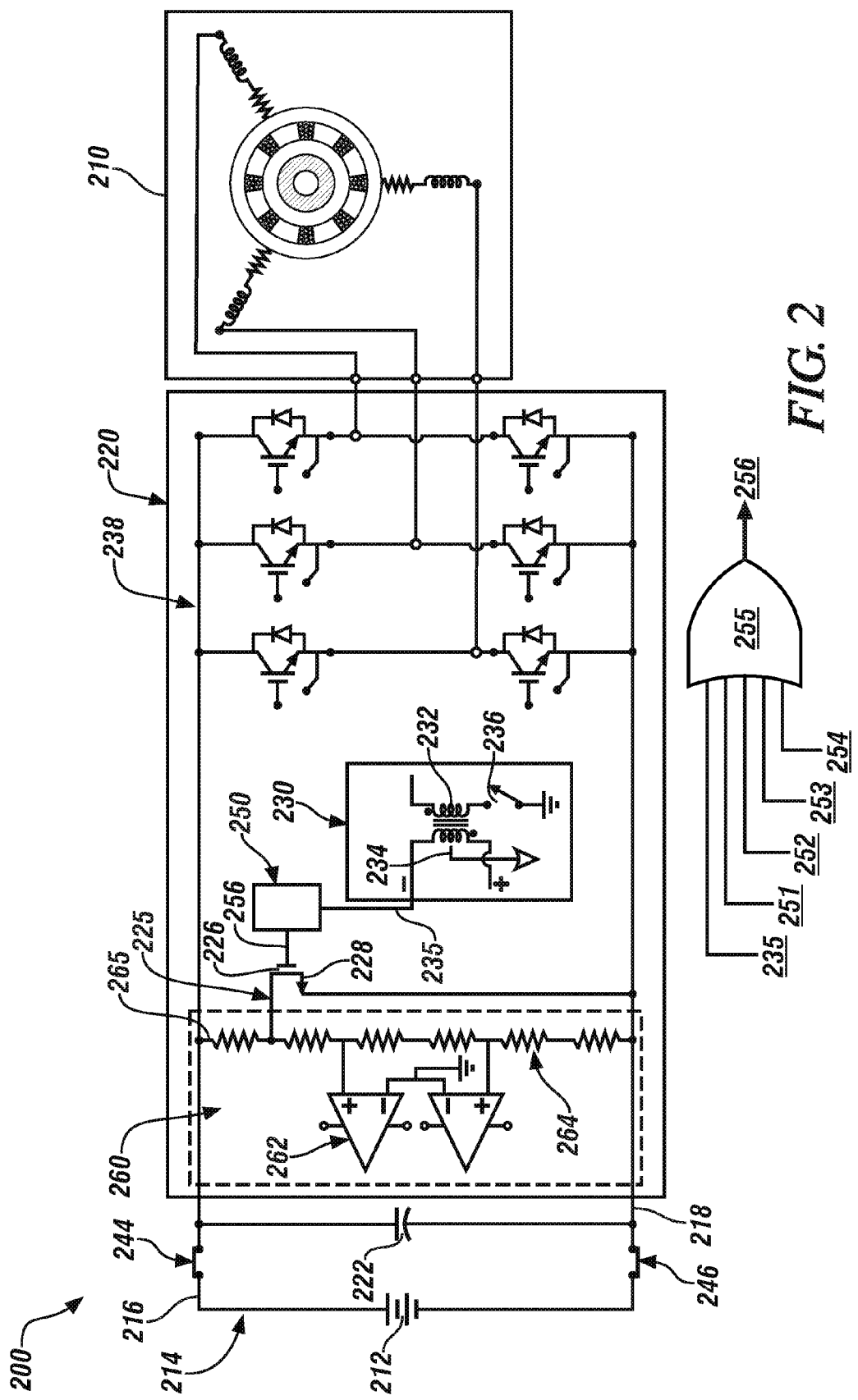

FIG. 2 schematically illustrates another embodiment of the power inverter module 220 that includes a passive discharge circuit 225 for discharging electric power across a high-voltage bus 214, wherein the high-voltage bus 214 is electrically connected between a high-voltage DC electric power source 212 and the power inverter module 220. The power inverter module 220 may be an element of a first embodiment of a motor control system 200 that includes an electric machine 210 that is operatively controlled by the power inverter module 220 employing electric power from the high-voltage DC electric power source 212. In one non-limiting embodiment, the power inverter module 220 may be employed on a vehicle as an element of a propulsion system.

The electric machine 210 may be a motor/generator or another suitable multi-phase electric machine, e.g., a permanent magnet device. The power inverter module 220 electrically connects to the high-voltage DC electric power source 212 via a positive conductor 216 and a negative conductor 218 of the high-voltage bus 214. The high-voltage bus 214 may include first and second contactors 244, 246, respectively, that are controllable to connect the respective positive and negative conductors 216, 218 of the high-voltage bus 214 to positive and negative sides of the high-voltage DC electric power source 212. The power inverter module 220 includes a bulk capacitor 222 electrically arranged between the positive conductor 216 and the negative conductor 218 of the high-voltage bus 214.

The first and second contactors 244, 246 are inductively-controlled normally-open switch devices that electrically connect to an ignition switch 236. When the ignition switch 236 is in a key-OFF state, the first and second contactors 244, 246 are open, thus preventing electric power flow between the respective positive and negative conductors 216, 218 and the high-voltage DC electric power source 212. When the ignition switch 236 is in a key-ON state, the first and second contactors 244, 246 are closed, thus permitting electric power flow between the respective positive and negative conductors 216, 218 and the high-voltage DC electric power source 212.

The power inverter module 220 includes an inverter 238 that includes a plurality of switch pairs that electrically connect in series between the positive and negative conductors 216, 218 of the high-voltage bus 214. Each of the switches of the switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. Each of the switch pairs corresponds to one of the phases of the electric machine 210. Other elements of the power inverter module 220 preferably include a plurality of gate drive circuits and a controller, wherein the gate drive circuits control activation and deactivation of the switches in response to control signals, e.g., pulsewidth-modulated control signals, which originate from the controller. The power inverter module 220 includes other electrical components including capacitors, resistors and other electrical circuit components to accomplish functions related to electrical noise suppression, load balancing and the like.

A voltage sensor 260 is arranged to monitor electrical potential across the positive conductor 216 and the negative conductor 218 of the high-voltage bus 214. The voltage sensor 260 preferably includes a pair of differential amplifiers 262, a discharge resistor 265 and plurality of sensing resistors 264. The discharge resistor 265 and the sensing resistors 264 are arranged in series. The differential amplifiers 262 are arranged to monitor voltage drop across the discharge resistor 265 and the sensing resistors 264. Preferably the discharge resistor 265 is a low-impedance device.

The passive discharge circuit 225 is disposed between the positive conductor 216 of the high-voltage bus 214 and the negative conductor 218 of the high-voltage bus 214. The passive discharge circuit 225 includes a normally-ON discharge switch 226 and the discharge resistor 265 of the voltage sensor 260. The discharge switch 226 in this embodiment may be an N-channel depletion mode MOSFET device, or a JFET device, or another suitable device that operates as described herein. The discharge switch 226 includes an input line, an output line and a control gate 228. The discharge switch 226 is controllable to an open state between the positive and negative conductors 216, 218 of the high-voltage bus 214 when the ignition switch 236 is in the key-ON state. The discharge switch 226 achieves a closed state to provide a low-impedance electric current flow path through the discharge resistor 265 between the positive and negative conductors 216, 218 of the high-voltage bus 214 when the ignition switch 236 is in the key-OFF state.

A composite trigger gate 255 communicates with the control gate 228 of the discharge switch 226. The composite trigger gate 255 may be in the form of a multi-input logic device configured with a plurality of input lines 235, 251, 252, 253, and 254 and a discrete output line 256. The discrete output line 256 communicates with the control gate 228 of the discharge switch 226. The composite trigger gate 255 may be a logic OR gate or another suitable logic device that accommodates input signals via the plurality of input lines 235, 251, 252, 253, and 254, including the input line 235, and corresponding second, third, fourth and fifth activation signals. The second, third, fourth and fifth activation signals may originate from a vehicle controller, a service controller, an accelerometer, or another suitable source.

A flyback transformer 230 including a primary circuit 232 and a secondary circuit 234 is arranged with the secondary circuit 234 in communication with one of the input lines, e.g., line 235 to the composite trigger gate 255. The primary circuit 232 is electrically connected between a low-voltage power supply and an electrical ground via the ignition switch 236. The flyback transformer 230 may be an element of a DC supply associated with the gate drivers of the inverter switches 238, and is preferably electrically isolated.

During operation, with the ignition switch 236 in the key-ON state, the flyback transformer 230 may provide an electrical bias to control the discharge switch 226 to the OFF or open state. When the ignition switch 236 is in the key-OFF state, e.g., in response to a vehicle off state, or in response to a loss of low-voltage DC electric power, the flyback transformer 230 is de-energized, causing power at the control gate 228 of the discharge switch 226 to deplete, enabling the passive discharge circuit 225 to activate and discharge any electric energy on the high-voltage bus 214. When the first and second contactors 244, 246 are both closed and the discharge switch 226 is closed, i.e., de-activated, there is no electric current flow through the discharge resistor 265, and thus no latent or residual electric power loss.

When the composite trigger gate 255 generates an activation signal on the discrete output line 256, the discharge resistor 265 of the passive discharge circuit 225 passively discharges electric power stored in the bulk capacitor 222, the power inverter module 220 and the electric machine 210 across the positive conductor 216 and the negative conductor 218 of the high-voltage bus 214. The composite trigger gate 255 may generate the activation signal on the discrete output line 256 when one of the associated conditions is satisfied.

The low-impedance discharge resistor 265 may be sized based upon the magnitude of the electric potential across the high-voltage bus 214 and a preferred or desired discharge time. The average power rating may be reduced to a rating that comprehends peak power capability, and thus differs from resistances of devices employed in an active system. The discharge power, which drives the power rating of the low-impedance discharge resistor 265, may be determined based upon the magnitude of the electric potential across the high-voltage bus 214, the preferred or desired discharge time, and the capacitance of the bulk capacitor 222. The design parameters for the discharge switch 226 may be determined based upon the magnitude of the electric potential across the high-voltage bus 214, electrical current, the preferred discharge time, and the resistance of the low-impedance discharge resistor 265.

The concepts described herein include a passive discharge circuit 225 that consumes little or no electrical energy while permitting rapid, automatic discharge of electric potential in the high-voltage bus. The time period for rapid discharge may be less than five seconds in certain embodiments. The discharge circuit 225 may further prevent an over-discharge of the high-voltage DC electric power source 212 in a situation when the contactors 244, 246 become welded. The discharge circuit 225 may be responsive to operation in a UCG mode and may provide protection in the event of airbag deployment. The discharge circuit 225 may prevent inadvertent discharge of the high-voltage DC electric power source 212 which may otherwise be caused when the system is dropped or experiences a high g-force event when the ignition switch 236 is in the key-ON state.

Figure 3:
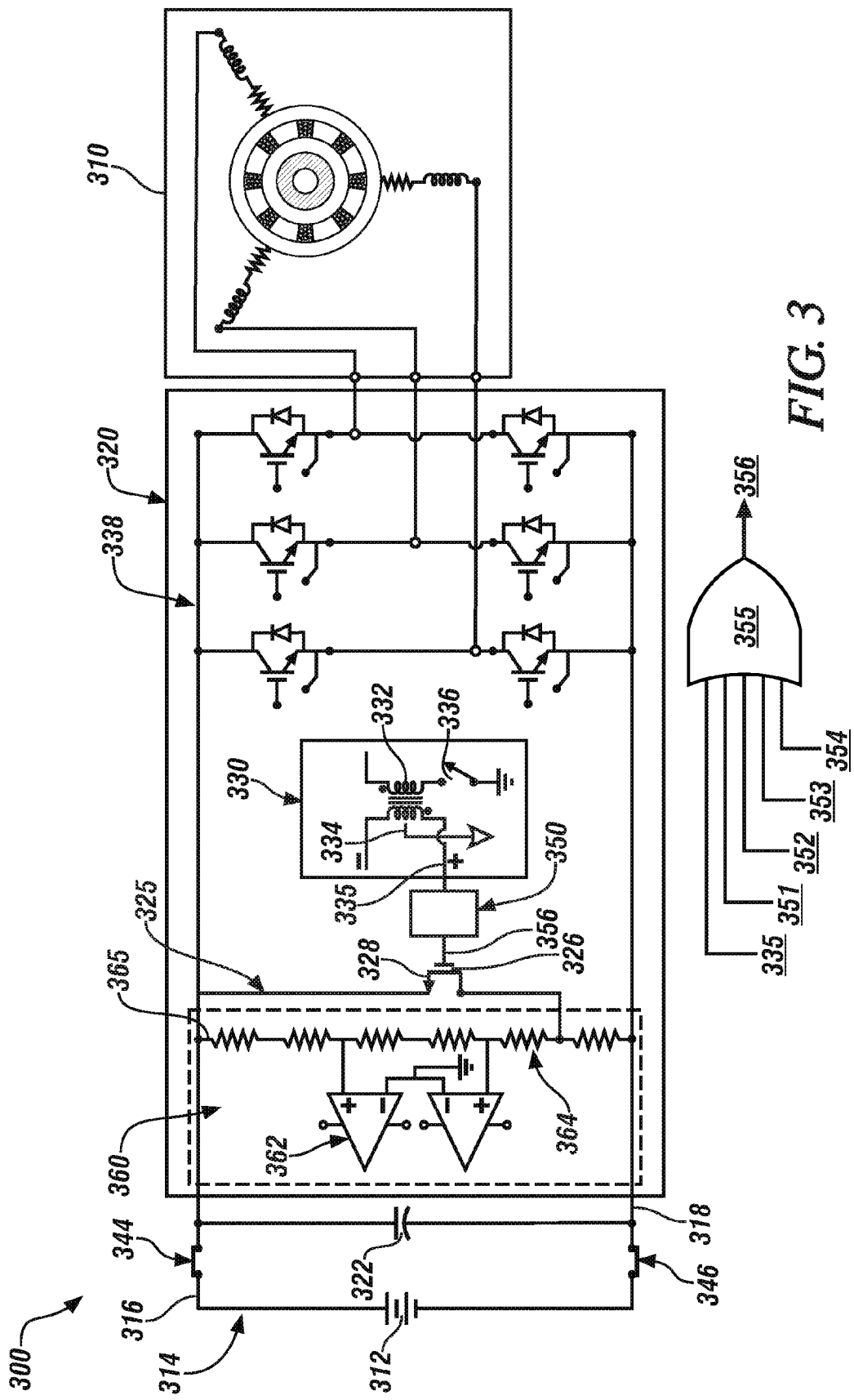

FIG. 3 schematically illustrates another embodiment of the power inverter module 320 that includes a passive discharge circuit 325 for discharging electric power across a high-voltage bus 314, wherein the high-voltage bus 314 is electrically connected between a high-voltage DC electric power source 312 and the power inverter module 320. The power inverter module 320 may be an element of a first embodiment of a motor control system 300 that includes an electric machine 310 that is operatively controlled by the power inverter module 320 employing electric power from the high-voltage DC electric power source 312. In one non-limiting embodiment, the power inverter module 320 may be employed on a vehicle as an element of a propulsion system.

The electric machine 310 may be a motor/generator or another suitable multi-phase electric machine, e.g., a permanent magnet device. The power inverter module 320 electrically connects to the high-voltage DC electric power source 312 via a positive conductor 316 and a negative conductor 318 of the high-voltage bus 314. The high-voltage bus 314 may include first and second contactors 344, 346, respectively, that are controllable to connect the respective positive and negative conductors 316, 318 of the high-voltage bus 314 to positive and negative sides of the high-voltage DC electric power source 312. The power inverter module 320 includes a bulk capacitor 322 electrically arranged between the positive conductor 316 and the negative conductor 318 of the high-voltage bus 314.

The first and second contactors 344, 346 are inductively-controlled normally-open switch devices that electrically connect to an ignition switch 336. When the ignition switch 336 is in a key-OFF state, the first and second contactors 344, 346 are open, thus preventing electric power flow between the respective positive and negative conductors 316, 318 and the high-voltage DC electric power source 312. When the ignition switch 336 is in a key-ON state, the first and second contactors 344, 346 are closed, thus permitting electric power flow between the respective positive and negative conductors 316, 318 and the high-voltage DC electric power source 312.

The power inverter module 320 includes an inverter 338 that includes a plurality of switch pairs that electrically connect in series between the positive and negative conductors 316, 318 of the high-voltage bus 314. Each of the switches of the switch pairs may be an Insulated Gate Bipolar Transistor (IGBT) having a diode arranged in parallel, or another suitable high-voltage switch, e.g., a Field-Effect Transistor (FET) or a Silicon-Carbide (SiC) FET. Each of the switch pairs corresponds to one of the phases of the electric machine 310. Other elements of the power inverter module 320 preferably include a plurality of gate drive circuits and a controller, wherein the gate drive circuits control activation and deactivation of the switches in response to control signals, e.g., pulsewidth-modulated control signals, which originate from the controller. The power inverter module 320 includes other electrical components including capacitors, resistors and other electrical circuit components to accomplish functions related to electrical noise suppression, load balancing and the like.

A voltage sensor 360 is arranged to monitor electrical potential across the positive conductor 316 and the negative conductor 318 of the high-voltage bus 314. The voltage sensor 360 preferably includes a pair of differential amplifiers 362, a discharge resistor 365 and plurality of sensing resistors 364. The discharge resistor 365 and the sensing resistors 364 are arranged in series. The differential amplifiers 362 are arranged to monitor voltage drop across the discharge resistor 365 and the sensing resistors 364. Preferably the discharge resistor 365 is a low-impedance device.

The passive discharge circuit 325 is disposed between the positive conductor 316 of the high-voltage bus 314 and the negative conductor 318 of the high-voltage bus 314. The passive discharge circuit 325 includes a normally-ON discharge switch 326 and the discharge resistor 365 of the voltage sensor 360. The discharge switch 326 in this embodiment may be a P-channel JFET device or a MOSFET device arranged in a normally-ON state. The discharge switch 326 includes an input line, an output line and a control gate 328.

A composite trigger gate 355 communicates with the control gate 328 of the discharge switch 326. The composite trigger gate 355 may be in the form of a multi-input logic device configured with a plurality of input lines 335, 351, 352, 353, and 354 and a discrete output line 356. The discrete output line 356 communicates with the control gate 328 of the discharge switch 326. The composite trigger gate 355 may be a logic OR gate or another suitable logic device that accommodates input signals via the plurality of input lines 335, 351, 352, 353, and 354, including the input line 335, and corresponding second, third, fourth and fifth activation signals. The second, third, fourth and fifth activation signals may originate from a vehicle controller, a service controller, an accelerometer, or another suitable source.

A flyback transformer 330 including a primary circuit 332 and a secondary circuit 334 is arranged with the secondary circuit 334 in communication with one of the input lines, e.g., line 335 to the composite trigger gate 355. The primary circuit 332 is electrically connected between a low-voltage power supply and an electrical ground via the ignition switch 336. The flyback transformer 330 may be an element of a DC supply associated with the switches of the inverter 338, and is preferably electrically isolated.

During operation, with the ignition switch 336 closed, the flyback transformer 330 may provide an electrical bias to control the discharge switch 326 to the OFF or open state. When the ignition switch 336 opens, e.g., in response to a vehicle off state, or in response to a loss of low-voltage DC electric power, the flyback transformer 330 is de-energized, causing power at the control gate 328 of the discharge switch 326 to deplete, enabling the passive discharge circuit 325 to activate and discharge any electric energy on the high-voltage bus 314.

When the first and second contactors 344, 346 are both closed and the discharge switch 326 is closed, i.e., de-activated, there is no electric current flow through the discharge resistor 365, and thus no latent or residual electric power loss.

When the composite trigger gate 355 generates an activation signal on the discrete output line 356, the discharge resistor 365 of the passive discharge circuit 325 passively discharges electric power stored in the bulk capacitor 322, the power inverter module 320 and the electric machine 310 across the positive conductor 316 and the negative conductor 318 of the high-voltage bus 314. The composite trigger gate 355 may generate the activation signal on the discrete output line 356 when one of the associated conditions is satisfied.

The low-impedance discharge resistor 324 may be sized based upon the magnitude of the electric potential across the high-voltage bus 314 and a preferred or desired discharge time. The average power rating may be reduced to a rating that comprehends peak power capability, and thus differs from resistances of devices employed in an active system. The discharge power, which drives the power rating of the low-impedance discharge resistor 324, may be determined based upon the magnitude of the electric potential across the high-voltage bus 314, the preferred or desired discharge time, and the capacitance of the bulk capacitor 322. The design parameters for the discharge switch 326 may be determined based upon the magnitude of the electric potential across the high-voltage bus 314, electrical current, the preferred discharge time, and the resistance of the low-impedance discharge resistor 324.

The concepts described herein include a passive discharge circuit 325 that consumes little or no electrical energy while permitting rapid, automatic discharge of electric potential in the high-voltage bus. The time period for rapid discharge may be less than five seconds in certain embodiments. The discharge circuit 325 may further prevent an over-discharge of the high-voltage DC electric power source 312 in a situation when the contactors 344, 346 become welded. The discharge circuit 325 may be responsive to operation in a UCG mode and may provide protection in the event of airbag deployment. The discharge circuit 325 may prevent inadvertent discharge of the high-voltage DC electric power source 312 which may otherwise be caused when the system is dropped or experiences a welded contactor, or experiences a high g-force event when the ignition switch 336 is in the key-ON state.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. Data signals may include analog, discrete or digitized analog signals representing inputs from sensors, signals representing actuator commands, and communication signals between controllers. The term 'model' refers to a processor-based or processor-executable code and associated calibration that simulates a physical existence of a device or a physical process. Additionally, it is noted that the term "signal" means a detectable physical quantity that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A power inverter electrically connected to a high-voltage DC power source via a high-voltage bus, including a capacitor electrically connected between positive and negative conductors of the high-voltage bus, the power inverter comprising:
   a multi-phase inverter circuit electrically connected to the positive and negative conductors of the high-voltage bus;
   a normally-ON discharge switch electrically connected in series with a discharge resistor between the positive and negative conductors of the high-voltage bus, the discharge switch including a control gate, wherein the control gate of the discharge switch is in communication with an ignition switch; and
   a transformer having a primary circuit and a secondary circuit, wherein the secondary circuit is in communication with the control gate of the discharge switch and the primary circuit is electrically connected between a low-voltage power supply and a ground;
   wherein the discharge switch is controllable to an open state between the positive and negative conductors of the high-voltage bus when the ignition switch is in a key-ON state; and
   wherein the discharge switch achieves a closed state to provide a low-impedance electric current flow path through the discharge resistor between the positive and negative conductors of the high-voltage bus when the ignition switch is in a key-OFF state.

2. The power inverter of claim 1, further comprising a composite trigger gate having a plurality of inputs and a single output, wherein the secondary circuit of the transformer is in communication with one of the inputs of the composite trigger gate, and wherein the single output of the composite trigger gate is in communication with the control gate of the discharge switch.

3. The power inverter of claim 2, wherein the discharge switch achieves a closed state and provides a low-impedance electric current flow path through the discharge resistor between the positive and negative conductors of the high-voltage bus when one of the plurality of inputs achieves a discrete state of "1".

4. The power inverter of claim 1, further comprising a voltage sensor arranged to monitor electrical potential between the positive conductor and the negative conductor of the high-voltage bus, wherein the voltage sensor includes a plurality of sensing resistors arranged in series with the discharge resistor.

5. The power inverter of claim 1, wherein the discharge switch is an N-channel depletion mode MOSFET device.

6. A device electrically connected to a high-voltage DC power source via a high-voltage bus including a capacitor electrically connected between positive and negative conductors of the high-voltage bus, comprising:
- a discharge switch electrically connected in series with a discharge resistor between the positive and negative conductors of the high-voltage bus, the discharge switch including a control gate;
- a composite trigger gate having a plurality of input lines and an output line in communication with the control gate of the discharge switch; and
- a transformer having a primary circuit and a secondary circuit, wherein the secondary circuit is in communication with the control gate of the discharge switch and the primary circuit is electrically connected between a low-voltage power supply and a ground; wherein the secondary circuit is in communication with one of the input lines of the composite trigger gate and the primary circuit is electrically connected between a low-voltage power supply and a ground;
- wherein the discharge switch is controllable to a closed state to provide a low-impedance electric current flow path through the discharge resistor between the positive and negative conductors of the high-voltage bus in response to an activation signal to one of the input lines of the composite trigger gate that is communicated to the gate of the discharge switch.

7. The power inverter of claim 6, wherein the discharge switch is controllable to the closed state to provide a low-impedance electric current flow path through the discharge resistor between the positive and negative conductors of the high-voltage bus in response to the ignition switch being in a key-OFF state.

8. The power inverter of claim 6, wherein the discharge switch is controllable to an open state to provide a high-impedance resistance to current flow through the discharge resistor between the positive and negative conductors of the high-voltage bus when the ignition switch is in a key-ON state and the input lines to the composite trigger gate are in a high state.

9. The power inverter of claim 6, wherein the power inverter electrically connects to an electric machine.

10. The power inverter of claim 6, wherein the discharge resistor comprises a resistor having an impedance that is selected to discharge the capacitor within a specified time period.

11. The power inverter of claim 6, wherein the capacitor is electrically connected between the positive and negative conductors of the high-voltage bus in parallel with the discharge switch that is electrically connected in series with the discharge resistor.

12. The power inverter of claim 6, wherein each of the first and second trigger circuits comprises an inductive device that electrically connects to a signal line that is electrically connected to the respective first or second contactor via a resistance-capacitance circuit and a diode, and wherein an output line communicates with a one-shot multivibrator that is in communication with the gate of the discharge switch.

13. A power inverter disposed to control an electric machine, the power inverter being electrically connected to a high-voltage DC power source via a high-voltage bus, the power inverter comprising:
- a multi-phase inverter circuit electrically connected to positive and negative conductors of the high-voltage bus;
- a capacitor electrically connected between the positive and negative conductors of the high-voltage bus; and
- a passive discharge circuit disposed between the positive and negative conductors of the high-voltage bus, including a discharge switch electrically connected in series with a discharge resistor between the positive and negative conductors of the high-voltage bus, the discharge switch including a control gate, wherein the control gate of the discharge switch is in communication with an ignition switch; and
- a transformer having a primary circuit and a secondary circuit, wherein the secondary circuit is in communication with the control gate of the discharge switch and the primary circuit is electrically connected between a low-voltage power supply and a ground;
- wherein the discharge switch achieves a closed state to provide a low-impedance electric current flow path through the discharge resistor between the positive and negative conductors of the high-voltage bus when the ignition switch is in a key-OFF state.

14. The power inverter of claim 13, further comprising a composite trigger gate having a plurality of inputs and a single output, wherein the secondary circuit of the transformer is in communication with one of the inputs of the composite trigger gate, and wherein the single output of the composite trigger gate is in communication with the control gate of the discharge switch.

15. The power inverter of claim 14, wherein the discharge switch achieves a closed state and provides a low-impedance electric current flow path through the discharge resistor between the positive and negative conductors of the high-voltage bus when one of the plurality of inputs achieves a discrete state of "1".

16. The power inverter of claim 13, further comprising a voltage sensor arranged to monitor electrical potential between the positive conductor and the negative conductor of the high-voltage bus, wherein the voltage sensor includes a plurality of sensing resistors arranged in series with the discharge resistor.

17. The power inverter of claim 13, wherein the discharge switch is a normally-ON device.

* * * * *